United States Patent
Nakahara

(10) Patent No.: US 8,498,673 B2
(45) Date of Patent: Jul. 30, 2013

(54) SOFTWARE OUTPUT DESTINATION HANDLING TERMINAL, SYSTEM, METHOD, AND PROGRAM FOR THE SAME

(75) Inventor: Fumitaka Nakahara, Tokyo (JP)

(73) Assignee: NEC Corporation, Tokyo (JP)

( * ) Notice: Subject to any disclaimer, the term of this patent is extended or adjusted under 35 U.S.C. 154(b) by 10 days.

(21) Appl. No.: 13/384,980

(22) PCT Filed: Jul. 20, 2010

(86) PCT No.: PCT/JP2010/062185
§ 371 (c)(1),
(2), (4) Date: Jan. 19, 2012

(87) PCT Pub. No.: WO2011/010642
PCT Pub. Date: Jan. 27, 2011

(65) Prior Publication Data
US 2012/0122443 A1    May 17, 2012

(30) Foreign Application Priority Data

Jul. 23, 2009  (JP) ................................. 2009-172203

(51) Int. Cl.
*H04M 1/2745*  (2006.01)
(52) U.S. Cl.
USPC ........... 455/566; 455/418; 455/419; 455/420; 455/550.1
(58) Field of Classification Search
USPC ............................... 455/566, 418–420, 550.1
See application file for complete search history.

(56) References Cited

U.S. PATENT DOCUMENTS

| 7,519,470 | B2 * | 4/2009 | Brasche et al. ............... 701/457 |
| 2002/0051531 | A1 | 5/2002 | Suzuki |
| 2006/0156209 | A1 | 7/2006 | Matsuura et al. |
| 2009/0177663 | A1 * | 7/2009 | Hulaj et al. ..................... 707/10 |
| 2011/0009107 | A1 * | 1/2011 | Guba et al. .................... 455/418 |
| 2011/0302014 | A1 * | 12/2011 | Proctor et al. ............. 705/14.23 |
| 2012/0041878 | A1 * | 2/2012 | Yim ............................... 705/44 |

FOREIGN PATENT DOCUMENTS

| JP | 6-187163 A | 7/1994 |
| JP | 2001-222403 A | 8/2001 |
| JP | 2002-218105 A | 8/2002 |
| JP | 2006-236323 A | 9/2006 |
| JP | 2006-277727 A | 10/2006 |
| WO | WO 2004/077291 A1 | 9/2004 |

* cited by examiner

*Primary Examiner* — Nathan Mitchell
*Assistant Examiner* — Dung Lam
(74) *Attorney, Agent, or Firm* — Sughrue Mion, PLLC

(57) ABSTRACT

A software output destination handling terminal that handles a display terminal as a software output destination. Data indicating a type of the display terminal is received from the display terminal with which communication connection has been established, and data indicating a usage status of the user is obtained. Data indicating a display rule for a software application to be displayed under the usage status is obtained. In the rule, information designating the display terminal type is associated with information designating a category of the software application to be displayed at the display terminal having the type. Based on the rule, the category of the software application to be displayed at the relevant display terminal is specified. Based on the category, a software application belonging to the category is specified among software applications. Data indicating an instruction to the display terminal to display the software application is generated and sent thereto.

9 Claims, 6 Drawing Sheets

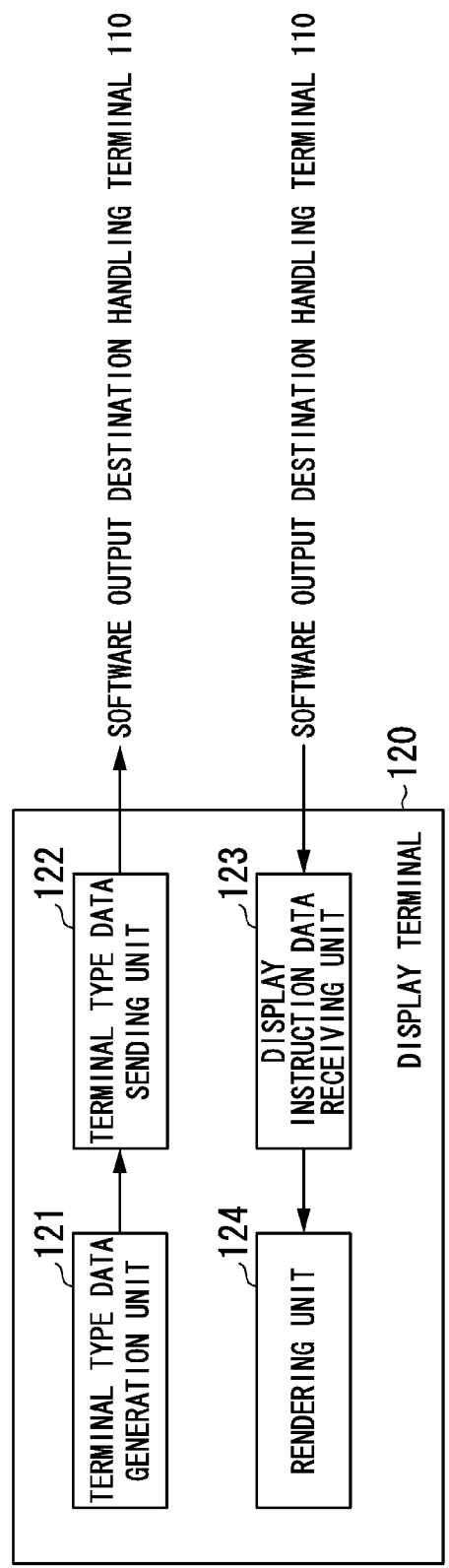

FIG. 4

DATA 300 WHICH INDICATES DISPLAY RULES

```
<?xml version="1.0" encoding="utf-8" ?>
<context>
    <location>tokyo</location>          ← 311  ⎫
    <temperature>over25</temperature>   ← 312  ⎬ 310
</context>                                     ⎭
<devicetype value="pda">                ← 320 (321a)
    <widgets>
        <widget value="Widget_1">       ← 330 (331a)
            <category value="schedule"> ← 340 (341a)
                <rank>1</rank>          ← 350 (351a)
            </category>
            <init>
                → <position>
                    <x>100</x>
                    <y>150</y>
                </position>
                → <enlarge>80</enlarge>
                → <rotate>0</rotate>
                → <transparency>0</transparency>
            </init>
        </widget>
        <widget value="Widget_2">       ← 330 (331b)
            <category value="mail">     ← 340 (341b)
                <rank>1</rank>          ← 350 (351b)
            </category>
            <init>
                → <position>
                    <x>120</x>
                    <y>300</y>
                </position>
                → <enlarge>100</enlarge>
                → <rotate>0</rotate>
                → <transparency>10</transparency>
            </init>
        </widget>
    <widgets>
</devicetype>
<devicetype value="music_player">       ← 320 (321b)
    <widgets>
        <widget value="Widget_3">       ← 330 (331c)
            <category value="schedule"> ← 340 (341c)
                <rank>2</rank>          ← 350 (351c)
            </category>
            <init>
                → <position>
                    <x>100</x>
                    <y>150</y>
                </position>
                → <enlarge>70</enlarge>
                → <rotate>0</rotate>
                → <transparency>0</transparency>
            </init>
        </widget>
    <widgets>
</devicetype>
```

Labels on left:
- 360 { 361a (position), 362a (enlarge), 363a (rotate), 364a (transparency) }
- 360 { 361b, 362b, 363b, 364b }
- 360 { 361c, 362c, 363c, 364c }

FIG. 5

SOFTWARE INFORMATION STORAGE UNIT 111

| SOFTWARE CATEGORY FIELD | SOFTWARE IDENTIFICATION FIELD | PRIORITY ORDER FIELD |
|---|---|---|
| schedule | Widget_N1 | 1 |
| schedule | Widget_N2 | 2 |
| mail | Widget_E1 | 1 |
| mail | Widget_E2 | 2 |
| advertisement | Widget_C1 | 1 |
| advertisement | Widget_C2 | 2 |

111a  111b  111c

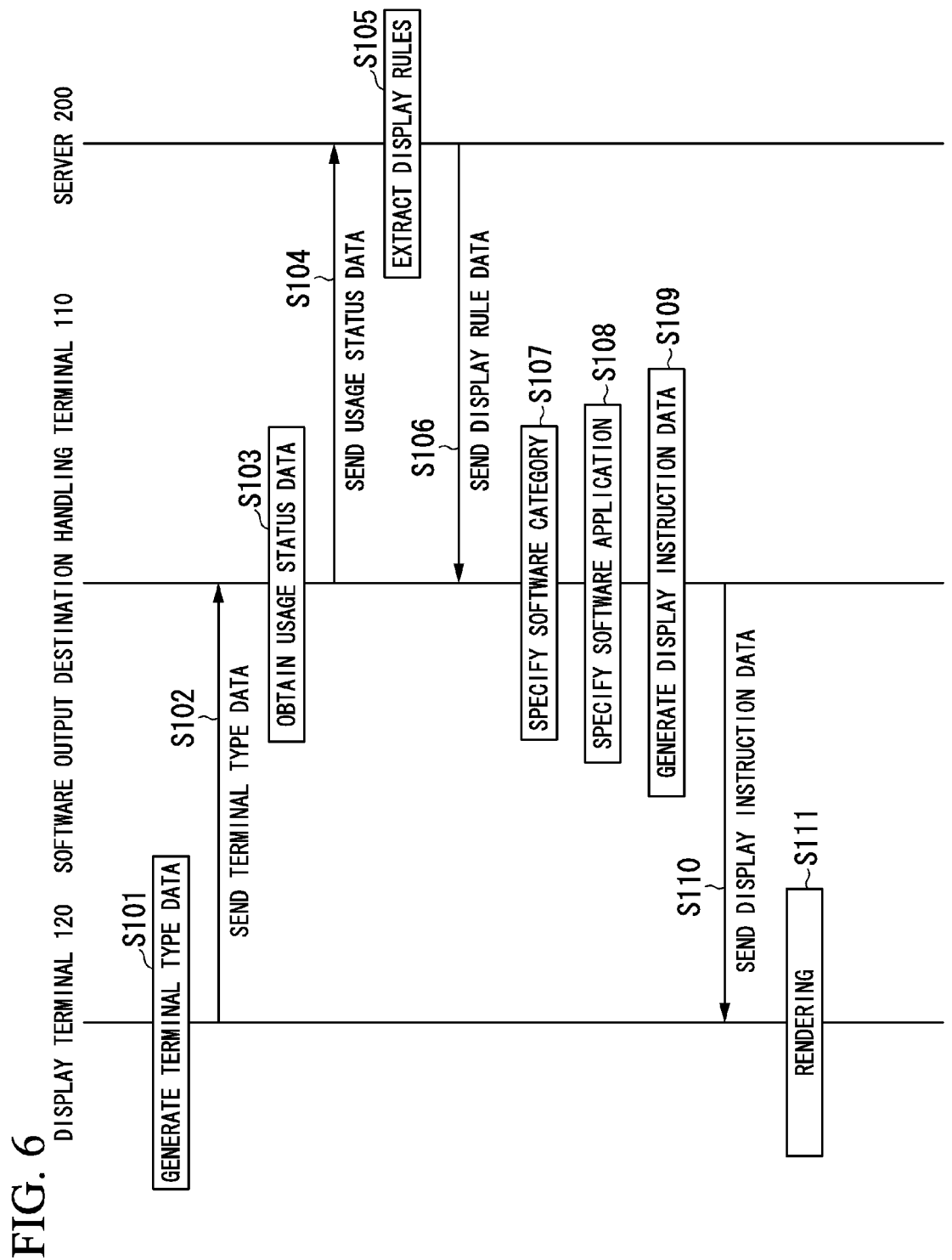

SOFTWARE OUTPUT DESTINATION HANDLING TERMINAL, SYSTEM, METHOD, AND PROGRAM FOR THE SAME

CROSS REFERENCE TO RELATED APPLICATIONS

This application is a National Stage of International Application No. PCT/JP2010/062185 filed on Jul. 20, 2010, which claims priority from Japanese Patent Application Nos. 2009-172203, filed on Jul. 23, 2009, the contents of all of which are incorporated herein by reference in their entirety.

TECHNICAL FIELD

The present invention relates to a software output destination handling terminal and a software output destination handling method for handling a display terminal as an output destination of a software application; a system which includes the software output destination handling terminal; and a program for the software output destination handling terminal.

Priority is claimed on Japanese Patent Application No. 2009472203, filed Jul. 23, 2009, the contents of which are incorporated herein by reference.

BACKGROUND ART

In most cases, users of a cellular phone also carries a portable information terminal separated from the cellular phone, where the portable information terminal is a dedicated device as a PDA (Personal Digital Assistant), a music player, a portable game machine, or the like, and it is difficult for the user to handle the cellular phone and the portable information terminal simultaneously.

For example, a user may play a game using a portable game machine while listening to music on a music player. In such a case, since the music player is generally contained in a pocket or the like, the user does not watch the display screen of the music player while playing the game using the portable game machine.

Such a portable information terminal may store a large number of small software applications (each having a simple functions) called "widgets" or "gadgets", and have a function of showing the software applications at desired positions on a screen.

Each software application may be especially effective when being executed at a specific position on the screen or at a specific time.

PRIOR ART DOCUMENT

Patent Document

Patent Document 1: Japanese Unexamined Patent Application, First Publication No. 2001-222403.
Patent Document 2: Japanese Unexamined Patent Application, First Publication No. 2006-277727.

DISCLOSURE OF INVENTION

Problem to be Solved by the Invention

As described above, the user basically handles only one portable information terminal, and a software application, which is especially effective when being executed at a specific position or at a specific time, is not always stored in the currently handled portable information terminal.

When using such a software application, the user terminates the operation of the currently handled portable information terminal, and activate and handle a portable information terminal which stores the relevant software application. Additionally, if the number of software applications stored in such a portable information terminal increases, it is difficult for the user to recognize the content of each software application.

Therefor, an object of the present invention is to provide a software output destination handling terminal, a software output destination handling method, a software output destination handling program, and a software output destination handling system, which can solve the above-described problems. This object is achieved by a combination of features shown in each independent claim in the claims. Each dependent claim defines further desirable specific embodiments of the present invention.

Means for Solving the Problem

In order to achieve the above object, the present invention provides a software output destination handling terminal that handles a display terminal as a destination to which a software application is output, and comprises:

a terminal type data receiving unit that receives from the display terminal with which connection by communication has been established, data which indicates a type of the relevant display terminal;

a usage status data obtaining unit that obtains data which indicates a usage status of a user of the display terminal;

a display rule data obtaining unit that obtains data which indicates a display rule for a software application to be displayed under the usage status indicated by the data obtained by the usage status data obtaining unit, where in the display rule, information for designating the type of the display terminal is associated with information for designating a category of the software application to be displayed at the display terminal having the relevant type;

a software category specifying unit that specifies, based on the display rule indicated by the data obtained by the display rule data obtaining unit, the category of the software application to be displayed at the display terminal having the type indicated by the data received by the terminal type data receiving unit;

a software specifying unit that specifies, based on the category of the software application specified by the software category specifying unit, a software application belonging to the category from among a plurality of software applications;

a display instruction data generation unit that generates data which indicates an instruction to the display terminal to display the software application specified by the software specifying unit; and a display instruction data sending unit that sends the data generated by the display instruction data generation unit to the display terminal.

The present invention also provides a software output destination handling method that handles a display terminal as a destination to which a software application is output, and comprises:

a terminal type data receiving step that receives from the display terminal with which connection by communication has been established, data which indicates a type of the relevant display terminal;

a usage status data obtaining step that obtains data which indicates a usage status of a user of the display terminal;

a display rule data obtaining step that obtains data which indicates a display rule for a software application to be displayed under the usage status indicated by the data obtained by the usage status data obtaining step, where in the display rule, information for designating the type of the display terminal is associated with information for designating a category of the software application to be displayed at the display terminal having the relevant type;

a software category specifying step that specifies, based on the display rule indicated by the data obtained by the display rule data obtaining step, the category of the software application to be displayed at the display terminal having the type indicated by the data received by the terminal type data receiving step;

a software specifying step that specifies, based on the category of the software application specified by the software category specifying step, a software application belonging to the category from among a plurality of software applications;

a display instruction data generation step that generates data which indicates an instruction to the display terminal to display the software application specified by the software specifying step; and a display instruction data sending step that sends the data generated by the display instruction data generation step to the display terminal.

The present invention also provides a software output destination handling program that makes a computer implement:

a terminal type data receiving function that receives from a display terminal with which connection by communication has been established, data which indicates a type of the relevant display terminal;

a usage status data obtaining function that obtains data which indicates a usage status of a user of the display terminal;

a display rule data obtaining function that obtains data which indicates a display rule for a software application to be displayed under the usage status indicated by the data obtained by the usage status data obtaining function, where in the display rule, information for designating the type of the display terminal is associated with information for designating a category of the software application to be displayed at the display terminal having the relevant type;

a software category specifying function that specifies, based on the display rule indicated by the data obtained by the display rule data obtaining function, the category of the software application to be displayed at the display terminal having the type indicated by the data received by the terminal type data receiving function;

a software specifying function that specifies, based on the category of the software application specified by the software category specifying function, a software application belonging to the category from among a plurality of software applications;

a display instruction data generation function that generates data which indicates an instruction to the display terminal to display the software application specified by the software specifying function; and a display instruction data sending function that sends the data generated by the display instruction data generation function to the display terminal.

The present invention also provides a software output destination handling system that has a display terminal which displays a software application and a software output destination handling terminal that handles the display terminal as a destination to which a software application is output, wherein:

the display terminal comprises:
a terminal type data generation unit that generates data which indicates a type of the present terminal;
a terminal type data sending unit that sends the data generated by the terminal type data generation unit to the software output destination handling terminal when connection with the software output destination handling terminal is established by communication;
a display instruction data receiving unit that receives data, which indicates an instruction to display the software application, from the software output destination handling terminal; and
a rendering unit that performs rendering of the software application in accordance with the data received by the display instruction data receiving unit; and the software output destination handling terminal comprises:
a terminal type data receiving unit that receives from the display terminal with which connection by communication has been established, data which indicates a type of the relevant display terminal;
a usage status data obtaining unit that obtains data which indicates a usage status of a user of the display terminal;
a display rule data obtaining unit that obtains data which indicates a display rule for a software application to be displayed under the usage status indicated by the data obtained by the usage status data obtaining unit, where in the display rule, information for designating the type of the display terminal is associated with information for designating a category of the software application to be displayed at the display terminal having the relevant type;
a software category specifying unit that specifies, based on the display rule indicated by the data obtained by the display rule data obtaining unit, the category of the software application to be displayed at the display terminal having the type indicated by the data received by the terminal type data receiving unit;
a software specifying unit that specifies, based on the category of the software application specified by the software category specifying unit, a software application belonging to the category from among a plurality of software applications;
a display instruction data generation unit that generates data which indicates an instruction to the display terminal to display the software application specified by the software specifying unit; and
a display instruction data sending unit that sends the data generated by the display instruction data generation unit to the display terminal.

Effect of the Invention

In accordance with the present invention, under a specific status, a software application which is especially effective when being executed at a specific terminal currently used by the user can be automatically displayed at the relevant terminal.

BRIEF DESCRIPTION OF THE DRAWINGS

FIG. 3 is a block diagram showing the functional structure of each display terminal 120.

FIG. 4 is a diagram showing an example of the data format of data which indicates display rules 300.

FIG. 5 is a diagram showing an example data format for the software information storage unit 111.

FIG. 6 is a flowchart showing an example of the software display procedure for displaying each software application at the relevant display terminal 120.

MODE FOR CARRYING OUT THE INVENTION

Below, the present invention will be explained by showing an embodiment. However, the following embodiment does not limit the invention shown in the claims, and all combinations of features explained in the embodiment are not always necessary for solving the problem for the invention.

Figure 1:
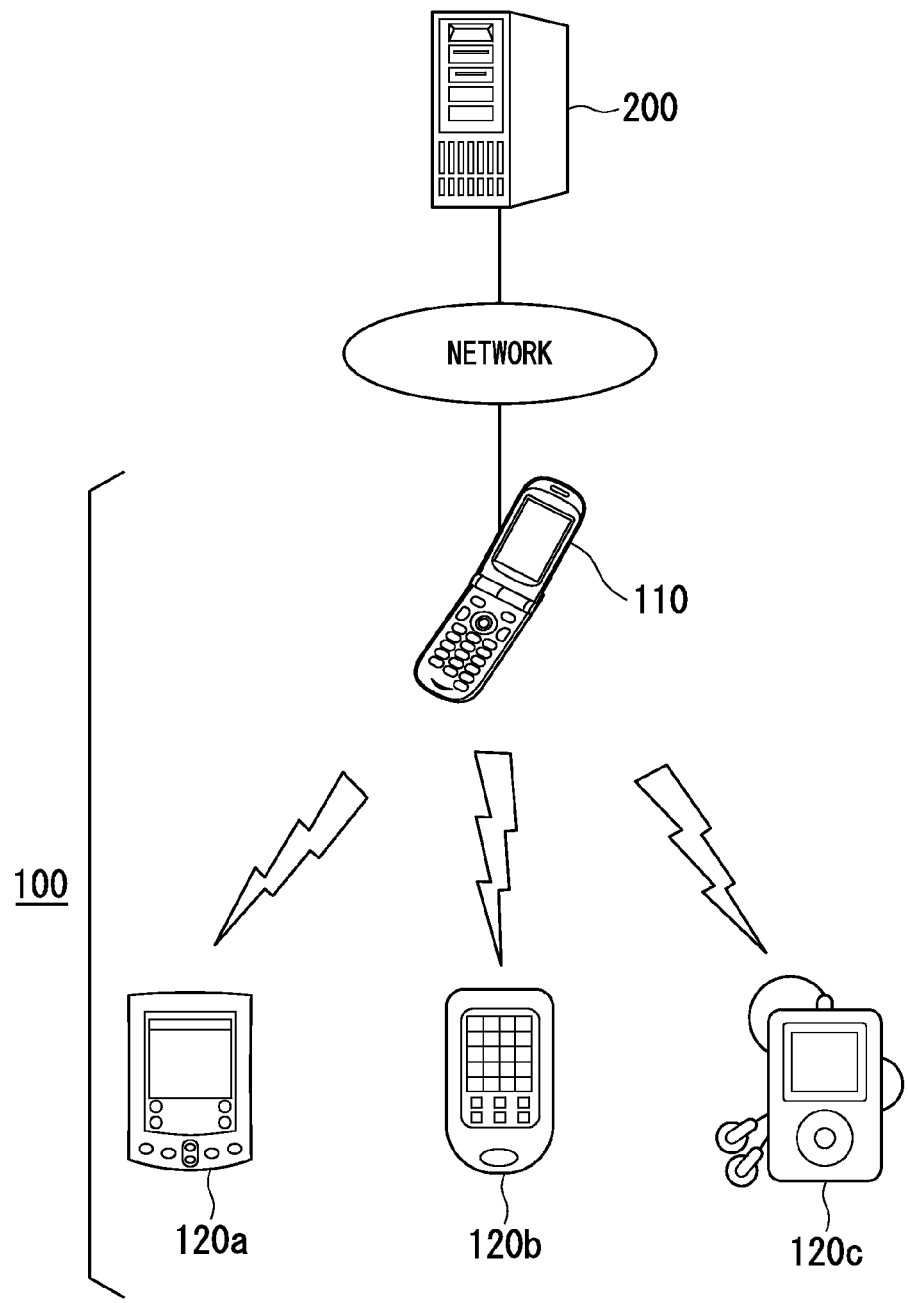
FIG. 1 is a diagram showing an example structure of a software output destination handling system 100 for a present embodiment, together with an external server 200.

FIG. 1 is a diagram showing an example structure of a software output destination handling system 100 for the present embodiment, together with an external server 200.

The software output destination handling system 100 includes a software output destination handling terminal 110 and display terminals 120a to 120c (each being representatively called "display terminal 120").

The software output destination handling terminal 110 is an electronic device carried by a user, and may be a cellular phone.

Each display terminal 120 performs short distance radio communication with the software output destination handling terminal 110, and may be a PDA, a digital audio player, or a portable game machine. The display terminal 120 is carried by a user, and displays, for example, a software application available by the user.

The server 200 is a terminal that sends each display terminal 120 display rules for displaying a software application, and is connected with the software output destination handling terminal 110 via a network.

The short distance radio communication performed between the software output destination handling terminal 110 and each display terminal 120 is possible when the physical distance between them is considerably shortened. The short distance radio communication may be Bluetooth (registered trademark), IrDA (Infrared Data Association), IrDA Control, IrSimple, NFC (Near Field Communication), UWB (Ultra Wide Band), Wibree, Wireless USB (Wireless Universal Serial Bus), or ZigBee.

The operation of the software output destination handling system 100 starts when power of a display terminal 120 is switched on while the distance between the software output destination handling terminal 110 and the display terminal 120 is considerably small so that the short distance radio communication between the software output destination handling terminal 110 and the display terminal 120 is possible. For example, the operation of the software output destination handling system 100 starts when a user who carries a cellular phone switches on the power of a PDA, which is also carried by the user, so that the short distance radio communication between the software output destination handling terminal 110 and the display terminal 120 becomes possible.

The operation of the software output destination handling system 100 ends when the short distance radio communication between the software output destination handling terminal 110 and the display terminal 120 becomes impossible due to an increased distance between the physical distance between the software output destination handling terminal 110 and the display terminal 120 or power-off of the display terminal 120. For example, the operation of the software output destination handling system 100 ends when a user who is handling a PDA moves away from a cellular phone or switched off the power of the PDA so that the short distance radio communication becomes impossible.

Figure 2:
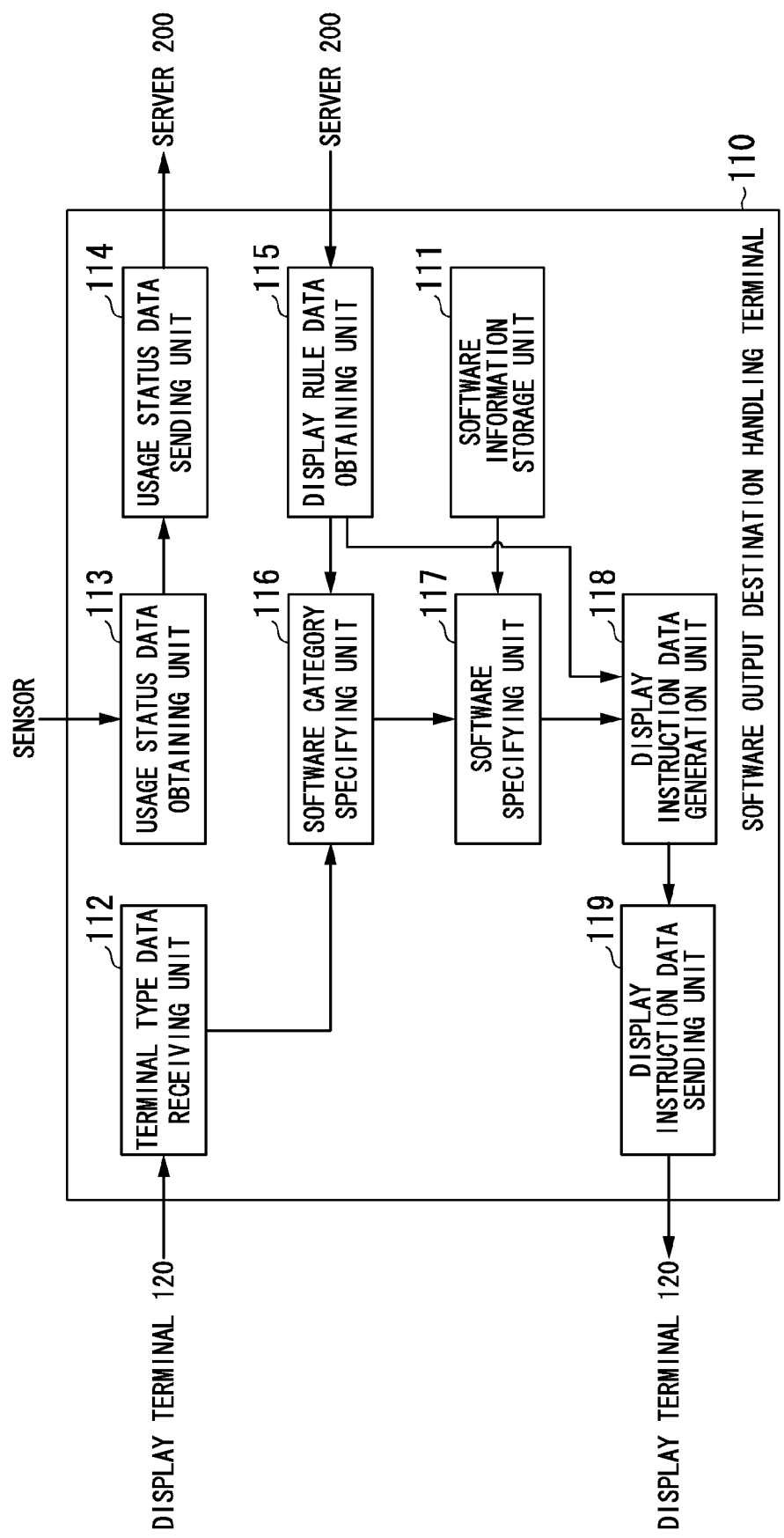
FIG. 2 is a block diagram showing the functional structure of the software output destination handling terminal 110.

FIG. 2 is a block diagram showing the functional structure of the software output destination handling terminal 110.

The software output destination handling terminal 110 has a software information storage unit 111, a terminal type data receiving unit 112, a usage status data obtaining unit 113, a usage status data sending unit 114, a display rule data obtaining unit 115, a software category specifying unit 116, a software specifying unit 117, a display instruction data generation unit 118, and a display instruction data sending unit 119.

The software information storage unit 111 stores data for identifying each software application stored in the software output destination handling terminal 110 and each display terminal 120, where said data is associated with data that indicates the category of the relevant software application. If there are software applications belonging to the same category, the software information storage unit 111 also stores data which indicates the order of priority for displaying the software applications, where said data is associated with the above data for identifying each software application.

The terminal type data receiving unit 112 receives from a display terminal 120 which has entered a state in which the short distance radio communication is possible, data which indicates the type of the relevant display terminal 120. The terminal type data receiving unit 112 then sends the received data to the software category specifying unit 116.

The usage status data obtaining unit 113 obtains data, which indicates a detected value variable according to the usage status of the software output destination handling terminal 110, from any type of sensor provided at the software output destination handling terminal 110. Under another situation, the usage status data obtaining unit 113 obtains data, which indicates a detected value variable according to the usage status of a display terminal 120, from any type of sensor provided at the display terminal 120 which has entered a state in which the short distance radio communication is possible.

The usage status data obtaining unit 113 sends the obtained data to the usage status data sending unit 114.

The usage status data sending unit 114 sends the data received from the usage status data obtaining unit 113 to the server 200.

The display rule data obtaining unit 115 receives data, which indicates each display rule, from the server 200, and sends the received data to the software category specifying unit 116 and the display instruction data generation unit 118.

Based on the data which indicates the type of the display terminal 120 and is received from the terminal type data receiving unit 112 and the data which indicates the display rule and is received from the display rule data obtaining unit 115, the software category specifying unit 116 specifies the category of the software application to be displayed at the display terminal 120, and sends data which indicates the specified software category to the software specifying unit 117.

When receiving the data which indicates the specified software category from the software category specifying unit 116, the software specifying unit 117 refers to the software information storage unit 111 and specifies a software application belonging to the relevant category. The software specifying unit 117 then sends the display instruction data generation unit 118, data for identifying the specified software application.

The display instruction data generation unit 118 receives the data which indicates the display rule from the display rule data obtaining unit 115, and also receives the data for identifying the relevant software application from the software specifying unit 117. The display instruction data generation unit 118 then generates data which indicates an instruction for displaying the specified software application in accordance with a rendering method based on the display rule, and sends the generated data to the display instruction data sending unit 119.

The display instruction data sending unit 119 sends the data, which is received from the display instruction data generation unit 118, to the display terminal 120.

FIG. 3 is a block diagram showing the functional structure of each display terminal 120.

The display terminal 120 has a terminal type data generation unit 121, a terminal type data sending unit 122, a display instruction data receiving unit 123, and a rendering unit 124.

The terminal type data generation unit 121 generates data which indicates the type of the present display terminal, and sends the data to the terminal type data sending unit 122.

The terminal type data sending unit 122 sends the data, which indicates the type of the terminal and is received from the terminal type data generation unit 121, to the software output destination handling terminal 110.

The display instruction data receiving unit 123 receives display instruction data from the software output destination handling terminal 110, and sends the received data to the rendering unit 124.

In accordance with the display instruction data received from the display instruction data receiving unit 123, the rendering unit 124 subjects the designated software application to rendering using the designated rendering method.

FIG. 4 is a diagram showing an example of the data format of data 300 which indicates the display rules.

The data 300 which indicates the display rules includes usage status specifying information 310, terminal type designating information 320, software information 330, software category designating information 340, software priority order designating information 350, and rendering method designating information 360.

The data 300 which indicates the display rule may be described using an existing mark-up language such as XML. In this case, information items 310 to 360 may be represented using tags of XML.

The usage status specifying information 310 is information used for specifying the usage status of the software output destination handling terminal 110 or the relevant display terminal 120. This information is specified by the usage status specifying information 310 based on data which indicates the usage status of the software output destination handling terminal 110 or the display terminal 120.

An independent tag corresponding to each usage status type is applied to the usage status specifying information 310. In the shown example, information "tokyo" which indicates a geographical location is specified using a tag 311 called "location". This information "tokyo" may indicate that the coordinates measured by a GPS module built in the software output destination handling terminal 110 or the display terminal 120 belong to Tokyo (metropolitan area).

In addition, information "over25" which indicates air temperature is specified using a tag 312 called "temperature". This information "over25" may indicate that the temperature measured by a temperature sensor built in the software output destination handling terminal 110 or the display terminal 120 is higher than 25° C.

The terminal type designating information 320 is information used for designating the type of the relevant terminal, where an independent value assigned to each terminal type is applied to the terminal type designating information 320.

Additionally, the software information 330, the software category designating information 340, the software priority order designating information 350, and the rendering method designating information 360 are associated with the terminal type designating information 320. These information items associated with the terminal type designating information 320 are applied to a terminal having the type designated by the terminal type designating information 320.

The shown example includes (i) a "devicetype" tag 321a which designates a terminal type of PDA and to which a value "pda" is applied, and (ii) a "devicetype" tag 321b which designates a terminal type of a music player and to which a value "music-player" is applied.

The software information 330 is information relating to a software application to be displayed at the terminal having the type designated by the terminal type designating information 320. When there are multiple software applications to be displayed at the terminal having the type designated by the terminal type designating information 320, a number of the software information items 330 corresponding to the number of the software applications are provided.

The shown example includes a "widget" tag 331a called "Widget_1" and a "widget" tag 331b called "Widget_2" so as to display two software applications in association with the "devicetype" tag 321a which designates a terminal type of PDA.

The shown example also includes a "widget" tag 331c called "Widget_3" so as to display one software application in association with the "devicetype" tag 321b which designates a terminal type of a music player.

The software category designating information 340 is information used for designating the category of each software application to be displayed. A value by which the category of the software application can be identified is applied to the software category designating information 340.

Additionally, the software priority order designating information 350 and the rendering method designating information 360 are associated with the software category designating information 340. These information items associated with the software category designating information 340 are applied to each software application designated by the software category designating information 340.

The shown example includes a "category" tag 341a to which a value "schedule" is applied in association with the "widget" tag 331a, where the value "schedule" designates a schedule management software application as the software category.

The shown example also includes a "category" tag 341b to which a value "mail" is applied in association with the "widget" tag 331b, where the value "mail" designates an electronic mail software application as the software category.

The shown example also includes a "category" tag 341c to which a value "schedule" is applied in association with the "widget" tag 331c, where the value "schedule" designates a schedule management software application as the software category.

The software priority order designating information 350 is information used for designating the order of priority for each software application to be displayed, with respect to each software category designated by the software category designating information 340.

Here, the rendering method designating information 360 is associated with the software priority order designating information 350, and is applied to each software application having the corresponding order of priority designated by the software priority order designating information 350.

The shown example includes a "rank" tag 351a in association with the "category" tag 341a which designates display of a schedule management software application, where the "rank" tag 351a designates display of a software application having the first order of priority among software applications belonging to the schedule management software category.

The shown example also includes a "rank" tag 351b in association with the "category" tag 341b which designates display of an electronic mail software application, where the "rank" tag 351b designates display of a software application having the first order of priority among software applications belonging to the electronic mail software category.

The shown example also includes a "rank" tag 351c in association with the "category" tag 341c which designates display of a schedule management software application, where the "rank" tag 351c designates display of a software application having the second order of priority among software applications belonging to the schedule management software category.

The rendering method designating information 360 is information used for designating a method of rendering the software application having each order of priority designated by the software priority order designating information 350, with respect to each software category designated by the software category designating information 340.

In the shown example, the rendering method designating information 360 designates the rendering method by using "position" tags 361a to 361c (representatively called "position tags 361"), "enlarge" tags 362a to 362c (representatively called "enlarge tags 362"), "rotate" tags 363a to 363c (representatively called "rotate tags 363"), and "transparency" tags 364a to 364c (representatively called "transparency tags 364").

Each position tag 361 is used for designating the coordinates on a screen on which the relevant software application is displayed. The position tag 361 consists of an "x tag" and a "y tag", where x tag and y tag respectively designate the x-coordinate and the y-coordinate of an upper-left position for the relevant software application. For example, the "position" tag 361a has the x tag of 100 and the y tag of 150, which means a designation to display the software application at a location whose upper-left position has x-y coordinate values of (100, 150).

Each enlarge tag 362 is used for designating the enlargement ratio for displaying the relevant software application. For example, the enlarge tag 362a has a value of 80, which means a designation to display the software application by scaling down the default size to 80% thereof.

Each rotate tag 363 is used for designating the rotation angle for displaying the relevant software application. For example, the rotate tag 363a has a value of 0, which means a designation to display the software application without rotating it.

Each transparency tag 364 is used for designating the transparency for displaying the relevant software application. For example, the transparency tag 363a has a value of 0, which means a designation to display the software application in no transparent manner.

FIG. 5 is a diagram showing an example data format for the software information storage unit 111.

The software information storage unit 111 has a software category field 111a, a software identification field 111b, and a priority order field 111c.

The software category field 111a stores information which indicates the category of each software application. The software identification field 111b stores information used for identifying the software application. The priority order field 111c stores information which indicates the order of priority for the software application.

In the shown example, the software category field 111a stores information "schedule" which indicates a schedule management software application, information "mail" which indicates an electronic mail software application, and information "advertisement" which indicates an advertisement software application.

Additionally, in the shown example, the software identification field 111b stores information items "Widget_N1" and "Widget_N2" which respectively indicate software applications called "Widget_N1" and "Widget_N2", in association with the information "schedule" in the software category field 111a.

The software identification field 111b also stores information items "Widget_E1" and "Widget_E2" which respectively indicate software applications called "Widget_E1" and "Widget_E2", in association with the information "mail" in the software category field 111a.

The software identification field 111b also stores information items "Widget_C1" and "Widget_C2" which respectively indicate software applications called "Widget_C1" and "Widget_C2", in association with the information "advertisement" in the software category field 111a.

Also in the shown example, the priority order field 111c stores information of "1" which indicates the first (highest) order of priority in association with the information items "Widget_N1", "Widget_N1", and "Widget_C1" in the software identification field 111b.

The priority order field 111c also stores information of "2" which indicates the second order of priority in association with the information items "Widget_N2", "Widget_E2", and "Widget_C2" in the software identification field 111b.

FIG. 6 is a flowchart showing an example of the software display procedure for displaying each software application at the relevant display terminal 120.

First, the terminal type data generation unit 121 of the relevant display terminal 120 generates data which indicates the type of the present terminal when, for example, the user switches on the power of the relevant display terminal 120 (see step S101).

Below, it is assumed that the display terminals 120a and 120b are PDAs, and the display terminal 120e is an MPS music player.

For example, when the user switches on the power of the display terminal 120a or 120b, the terminal type data generation unit 121 of the display terminal 120a or 120b generates data which indicates that the type of the present terminal is the PDA. When the user switches on the power of the display terminal 120c, the terminal type data generation unit 121 of the display terminal 120c generates data which indicates that the type of the present terminal is the music player.

When connection with the software output destination handling terminal 110 by means of communication is established, the terminal type data sending unit 122 of the relevant display terminal 120 sends the data generated by the terminal type data generation unit 121 to the software output destination handling terminal 110 (see step S102).

The data sent by the terminal type data sending unit 122 is received by the terminal type data receiving unit 112 of the software output destination handling terminal 110.

For example, the terminal type data sending unit 122 of the display terminal 120a or 120b sends the data, which indicates that the type of the present terminal is the PDA, to the software output destination handling terminal 110. In addition, the terminal type data sending unit 122 of the display terminal 120c sends the data, which indicates that the type of the present terminal is the music player, to the software output destination handling terminal 110.

On the other hand, the usage status data obtaining unit 113 of the software output destination handling terminal 110 obtains data which indicates the usage status of the user for the software output destination handling terminal 110 or the relevant display terminal 120 (see step S103).

In the present example, the usage status data obtaining unit 113 obtains the following data as data which indicates the usage status of the software output destination handling terminal 110:
(i) data which indicates positional information and is obtained from a GPS module built in the software output destination handling terminal 110; and
(ii) data which indicates the air temperature and is obtained from a temperature sensor provided at the software output destination handling terminal 110.

The usage status data sending unit 114 of the software output destination handling terminal 110 sends the data obtained by the usage status data obtaining unit 113 to the server 200 (see step S104).

In the present example, the usage status data sending unit 114 sends the server 200, the data which indicates positional information and was obtained from the GPS module built in the software output destination handling terminal 110, and the data which indicates the air temperature and was obtained from the temperature sensor provided at the software output destination handling terminal 110.

Based on the data which was received from the software output destination handling terminal 110 and indicates the usage status of the software output destination handling terminal 110 or the relevant display terminal 120, the server 200 extracts display rules used when the display terminal 120 displays each software application (see step S105).

For example, the server 200 has each display rule in association with each of various usage statuses. When receiving the data which indicates the usage status from the software output destination handling terminal 110, the server 200 extracts a display rule associated with the relevant usage status.

In the shown example, the server 200 extracts data 300 which indicates display rules (explained above by referring to FIG. 4), based on the data which indicates the shown position and also the data which indicates the air temperature received from the software output destination handling terminal 110. The server 200 then sends the extracted data 300 (indicating the relevant display rules) to the software output destination handling terminal 110 (see step S106).

The software output destination handling terminal 110 receives the data 300, which indicates the display rules and is received from the server 200, by using the display rule data obtaining unit 115.

Based on the display rules indicated by the data obtained by the display rule data obtaining unit 115, the software category specifying unit 116 of the software output destination handling terminal 110 specifies each software application to be displayed by the corresponding terminal having the type indicated by the data received by the terminal type data receiving unit 112 (see step S107).

In the shown example, among data items 300 indicating the relevant display rules, the software category specifying unit 116 specifies the terminal type designating information items 320 respectively corresponding to the types of the display terminals 120, and then specifies the software category designating information items 340 respectively associated with the specified terminal type designating information items 320.

For example, since the display terminals 120a and 120b have the same type "PDA", the software category specifying unit 116 specifies a category of "schedule management software application" designated by the "category" tag 341a and a category of "electronic mail software application" designated by the "category" tag 341b, where the "category" tags 341a and 341b are associated with the "devicetype" tag 321a which designates the terminal type of PDA.

In addition, since the display terminals 120c has the type called "music player", the software category specifying unit 116 specifies a category of "schedule management software application" designated by the "category" tag 341c, which is associated with the "devicetype" tag 321b which designates the terminal type of the music player.

Based on each software category specified by the software category specifying unit 116, the software specifying unit 117 of the software output destination handling terminal 110 specifies each software application which belongs to the relevant category among the software applications stored by the software output destination handling terminal 110 or the display terminals 120a to 120c (see step S108).

In the present example, among the software applications belonging to the schedule management software category, the software specifying unit 117 specifies, by referring to the software information storage unit 111, the software application having the first order of priority designated by the "rank" tag 351a, as the software application to be displayed at the display terminals 120a and 120b.

When the software information storage unit 111 has the data format shown in FIG. 5, the software specifying unit 117 specifies a software application identified by the information "Widget_N1".

Similarly, as the electronic mail software application having the first order of priority, the software specifying unit 117 specifies a software application identified by the information "Widget_E1".

In addition, the software specifying unit 117 specifies a schedule management software application having the second order of priority as the software application to be displayed at the display terminal 120c whose terminal type is the music player.

The display instruction data generation unit 118 of the software output destination handling terminal 110 generates data which indicates an instruction to the display terminals 120a to 120c to display each software application specified by the software specifying unit 117 (see step S109).

Here, the display instruction data generation unit 118 generates the following data items which indicate an instruction to the display terminals 120a and 120b:
(i) to display a software application identified by the information "Widget_N1" by a rendering method designated using the "position" tag 361a, the "enlarge" tag 362a, the "rotate" tag 363a, and the "transparency" tag 364a of the rendering method designating information 360, and
(ii) to display a software application identified by the information "Widget_E1" by a rendering method designated using the "position" tag 361b, the "enlarge" tag 362b, the "rotate" tag 363b, and the "transparency" tag 364b of the rendering method designating information 360.

Similarly, the display instruction data generation unit 118 generates data which indicates an instruction to the display terminal 120c to display a software application identified by the information "Widget_N2" by a rendering method designated using the "position" tag 361c, the "enlarge" tag 362c, the "rotate" tag 363c, and the "transparency" tag 364c of the rendering method designating information 360.

The display instruction data sending unit 119 of the software output destination handling terminal 110 sends the data items generated by the display instruction data generation unit 118 to the relevant display terminals 120a to 120c (see step S110).

The display terminals 120a to 120c each receive the relevant data sent from the software output destination handling terminal 110, by using the display instruction data receiving unit 123.

The rendering unit 124 of each of the display terminals 120a to 120c performs rendering for the relevant software application based on the data received by the third function limitation unit 123 (see step S111).

In the present example, the rendering units 124 of the display terminals 120a and 120b each perform rendering of the software applications respectively identified by the information items "Widget_N1" and "Widget_E1" by using the corresponding rendering methods designated respectively.

In addition, the rendering unit 124 of the display terminal 120c performs rendering of the software application identified by the designated information "Widget_N2" by using the designated rendering method.

In the above process, if the display terminals 120a to 120c each store the software application (to be displayed) in the present terminal, the relevant software application is subjected to the rendering. If the display terminals 120a to 120c each do not store the software application (to be displayed) in the present terminal, the relevant display terminal 120 receives the relevant software application from the software output destination handling terminal 110 or another display terminal 120 and subjects it to the rendering based on the designated rendering method.

As described above, for each display terminal 120 whose power is switched on by the user, the software output destination handling terminal 110 can automatically make the display terminal 120 to automatically display a software application which should be used in consideration of the present usage status of the software output destination handling terminal 110 or the display terminal 120.

In the present embodiment, the usage status data obtaining unit 113 obtains data from a sensor provided at the software output destination handling terminal 110. However, data may be obtained from a sensor provided at the display terminals 120a to 120c.

Additionally, the usage status data obtaining unit 113 of the present embodiment also obtains data which indicates positional information from a GPS module and data which indicates the air temperature from a temperature sensor. However, data which indicates a connection status to a radio LAN may be obtained from a radio LAN module; data which indicates a usage status for a contactless IC card may be obtained from a contactless IC card reader/writer module; data which indicates humidity may be obtained from a humidity sensor; data which indicates the body temperature of the user may be obtained from a body temperature sensor; and data which indicates the blood pressure of the user may be obtained from a blood pressure sensor.

Below, a first variation of the present embodiment will be shown. Although the software output destination handling terminal 110 of the present embodiment has the software information storage unit 111, the software information storage unit 111 may be omitted. In such a case, the software specifying unit 117 may obtain the frequency in use of each software application, so as to determine the order of priority for the software selection.

Next, a second variation of the present embodiment will be shown. The software output destination handling terminal 110 of the present embodiment specifies the same software application for each terminal having the same type. However, an individual order of priority may be applied to each terminal, and software specification may be performed in a manner such that a software application having a higher order of priority or a higher frequency in use may be displayed at a terminal having a higher order of priority, that is, in order of priority from the highest to the lowest.

Next, a third variation of the present embodiment will be shown. The software output destination handling terminal 110 of the present embodiment sends the server 200, data which indicates the usage status of the relevant terminal and is obtained by a sensor provided at the present terminal 110 or the relevant display terminal 120. However, in addition to the data which indicates the usage status, data which indicates the type or specification of the display terminal 120 may also be sent.

In such a case, the server 200 extracts display rules suitable for the conditions specified by the sent data items, and sends the extracted display rules to the software output destination handling terminal 110.

Next, a fourth variation of the present embodiment will be shown. The server 200 of the present embodiment has stored display rules in association with individual conditions for various usage statuses, and extracts and sends display rules associated with the condition suitable for each usage status indicated by the data received from the software output destination handling terminal 110. However, instead of storing such display rules in advance, display rules corresponding to the condition suitable for each usage status may be generated using a predetermined program.

While the present invention have been described using embodiments, the technical range of the present invention is not limited thereto. It is obvious for those skilled in the art that various modifications or improvements can be applied to the embodiments. Referring to the descriptions of the claims, it is also obvious that modes having such modifications or improvements are also contained in the technical range of the present invention.

INDUSTRIAL APPLICABILITY

In accordance with the present invention, under a specific status, a software application which is especially effective when being executed at a specific terminal currently used by the user can be automatically displayed at the relevant terminal.

REFERENCE SYMBOLS

100 software output destination handling system
110 software output destination handling terminal
111 software information storage unit
112 terminal type data receiving unit
113 usage status data obtaining unit
114 usage status data sending unit
115 display rule data obtaining unit
116 software category specifying unit
117 software specifying unit
118 display instruction data generation unit
119 display instruction data sending unit
120 display terminal 121 terminal type data generation unit
122 terminal type data sending unit
123 display instruction data receiving unit
124 rendering unit
200 server
300 data which indicates display rules
310 usage status specifying information
311 "location" tag
312 "temperature" tag
320 terminal type designating information
321 "devicetype" tag
330 software information
331 "widget" tag
340 software category designating information
341 "category" tag
350 software priority order designating information
351 "rank" tag
360 rendering method designating information
361 "position" tag
362 "enlarge" tag
363 "rotate" tags
364 "transparency" tag

The invention claimed is:

1. A software output destination handling terminal that handles a display terminal as a destination to which a software application is output, and comprises:
    a terminal type data receiving unit that receives from the display terminal with which connection by communication has been established, data which indicates a type of the relevant display terminal;
    a usage status data obtaining unit that obtains data which indicates a usage status of a user of the display terminal;
    a display rule data obtaining unit that obtains data which indicates a display rule for a software application to be displayed under the usage status indicated by the data obtained by the usage status data obtaining unit, where in the display rule, information for designating the type of the display terminal is associated with information for designating a category of the software application to be displayed at the display terminal having the relevant type;
    a software category specifying unit that specifies, based on the display rule indicated by the data obtained by the display rule data obtaining unit, the category of the software application to be displayed at the display terminal having the type indicated by the data received by the terminal type data receiving unit;
    a software specifying unit that specifies, based on the category of the software application specified by the software category specifying unit, a software application belonging to the category from among a plurality of software applications;
    a display instruction data generation unit that generates data which indicates an instruction to the display terminal to display the software application specified by the software specifying unit; and
    a display instruction data sending unit that sends the data generated by the display instruction data generation unit to the display terminal.

2. The software output destination handling terminal in accordance with claim 1, further comprising:
    a software information storage unit that stores data used for identifying each software application stored in the software output destination handling terminal or the display terminal, where said data is associated with data which indicates the category of the software application,
    wherein the software specifying unit extracts, based on the category of the software application specified by the software category specifying unit and the data stored by the software information storage unit, data for identifying a software application belonging to the specified category, and specifies the software application identified by the extracted data.

3. The software output destination handling terminal in accordance with claim 2, wherein:
    when the software information storage unit stores the data in a manner such that data items for identifying a plurality of software applications are associated with data which indicates one software application category, data which indicates the order of priority for displaying each software application is further associated with the associated data; and
    the software specifying unit specifies a software application having a higher order of priority by giving priority to the relevant software application.

4. The software output destination handling terminal in accordance with claim 1, wherein:
    when a plurality of software applications belonging to the specified category are stored, the software specifying unit specifies a software application having a higher frequency in use by giving priority to the relevant software application.

5. The software output destination handling terminal in accordance with claim 1, wherein:
    When specifying software applications to be displayed at a plurality of the display terminals of the same type, the software specifying unit performs the specification in a manner such that the display terminals respectively display different software applications.

6. The software output destination handling terminal in accordance with claim 1, further comprising:
    a usage status data sending unit that sends the data obtained by the usage status data obtaining unit to an external server,
    wherein the display rule data obtaining unit obtains the rule which indicates the display rule from the server to which the usage status data sending unit sends the data.

7. The software output destination handling terminal in accordance with claim 1, wherein:
    the display rule data obtaining unit obtains the rule which indicates the display rule that includes information which indicates a rendering method applied to the relevant software application; and
    the display instruction data generation unit generates display instruction information which indicates an instruction to the display terminal to display the software application specified by the software specifying unit, in accordance with the rendering method of the display rule indicated by the data obtained by the display rule data obtaining unit.

8. A software output destination handling method that handles a display terminal as a destination to which a software application is output, and comprises:
    a terminal type data receiving step that receives from the display terminal with which connection by communication has been established, data which indicates a type of the relevant display terminal;
    a usage status data obtaining step that obtains data which indicates a usage status of a user of the display terminal;
    a display rule data obtaining step that obtains data which indicates a display rule for a software application to be displayed under the usage status indicated by the data obtained by the usage status data obtaining step, where in the display rule, information for designating the type of the display terminal is associated with information for designating a category of the software application to be displayed at the display terminal having the relevant type;

a software category specifying step that specifies, based on the display rule indicated by the data obtained by the display rule data obtaining step, the category of the software application to be displayed at the display terminal having the type indicated by the data received by the terminal type data receiving step;

a software specifying step that specifies, based on the category of the software application specified by the software category specifying step, a software application belonging to the category from among a plurality of software applications;

a display instruction data generation step that generates data which indicates an instruction to the display terminal to display the software application specified by the software specifying step; and a display instruction data sending step that sends the data generated by the display instruction data generation step to the display terminal.

9. A software output destination handling system that has a display terminal which displays a software application and a software output destination handling terminal that handles the display terminal as a destination to which a software application is output, wherein:

the display terminal comprises:
- a terminal type data generation unit that generates data which indicates a type of the present terminal;
- a terminal type data sending unit that sends the data generated by the terminal type data generation unit to the software output destination handling terminal when connection with the software output destination handling terminal is established by communication;
- a display instruction data receiving unit that receives data, which indicates an instruction to display the software application, from the software output destination handling terminal; and
- a rendering unit that performs rendering of the software application in accordance with the data received by the display instruction data receiving unit; and the software output destination handling terminal comprises:
- a terminal type data receiving unit that receives from the display terminal with which connection by communication has been established, data which indicates a type of the relevant display terminal;
- a usage status data obtaining unit that obtains data which indicates a usage status of a user of the display terminal;
- a display rule data obtaining unit that obtains data which indicates a display rule for a software application to be displayed under the usage status indicated by the data obtained by the usage status data obtaining unit, where in the display rule, information for designating the type of the display terminal is associated with information for designating a category of the software application to be displayed at the display terminal having the relevant type;
- a software category specifying unit that specifies, based on the display rule indicated by the data obtained by the display rule data obtaining unit, the category of the software application to be displayed at the display terminal having the type indicated by the data received by the terminal type data receiving unit;
- a software specifying unit that specifies, based on the category of the software application specified by the software category specifying unit, a software application belonging to the category from among a plurality of software applications;
- a display instruction data generation unit that generates data which indicates an instruction to the display terminal to display the software application specified by the software specifying unit; and
- a display instruction data sending unit that sends the data generated by the display instruction data generation unit to the display terminal.

* * * * *

UNITED STATES PATENT AND TRADEMARK OFFICE
CERTIFICATE OF CORRECTION

| | | |
|---|---|---|
| PATENT NO. | : 8,498,673 B2 | Page 1 of 1 |
| APPLICATION NO. | : 13/384980 | |
| DATED | : July 30, 2013 | |
| INVENTOR(S) | : Fumitaka Nakahara | |

It is certified that error appears in the above-identified patent and that said Letters Patent is hereby corrected as shown below:

In the Specification

Column 1, Line 25: Delete "2009472203," and insert -- 2009-172203 --

Column 10, Line 32: Delete "Widget_N1" and insert -- Widget_E1 --

Column 10, Line 47: Delete "120e" and insert -- 120c --

Signed and Sealed this

Fourth Day of November, 2014

Michelle K. Lee
*Deputy Director of the United States Patent and Trademark Office*